March 6, 1934.     L. N. BAENZIGER     1,950,284
MOLDING MACHINE
Filed Sept. 7, 1932     5 Sheets-Sheet 1

Fig. 1.

Inventor
Leonard N Baenziger
By Arthur F. Randall Atty.

March 6, 1934.  L. N. BAENZIGER  1,950,284
MOLDING MACHINE
Filed Sept. 7, 1932   5 Sheets-Sheet 4

Inventor
Leonard N. Baenziger
By Arthur F. Randall
Atty

Patented Mar. 6, 1934

1,950,284

UNITED STATES PATENT OFFICE 1,950,284

MOLDING MACHINE

Leonard N. Baenziger, Abington, Mass., assignor to Joseph Bardwell, Whitman, Mass.

Application September 7, 1932, Serial No. 631,985

15 Claims. (Cl. 25—27)

My invention relates to molding machines and particularly to molding machines for use in the production of porcelain articles.

The object of the invention is to provide an improved automatic molding machine and it is also an object of the invention to provide an automatic molding machine of simple and efficient construction by means of which molded articles may be automatically and economically produced from dry-dust porcelain mix.

To these ends I have provided an automatic molding machine having the peculiar features of construction and mode of operation set forth in the following description, the several novel features of the invention being particularly pointed out and defined in the claims at the close thereof.

The illustrated embodiment of my invention comprises a framework 10 having a top plate 11 and a shelf 12.

Figure 1:
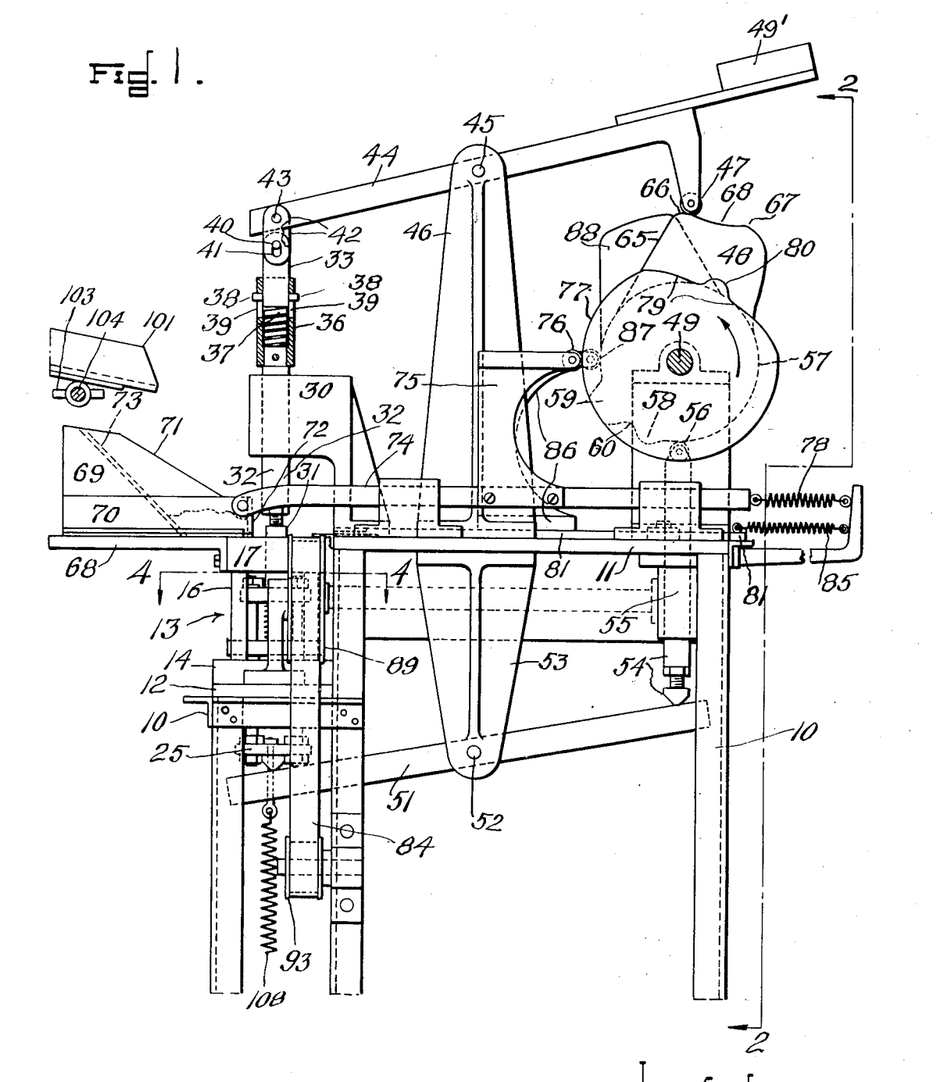
Figure 1 is a side elevation of an automatic dry-dust molding or pressing machine constructed in accordance with this invention.
Figure 3:
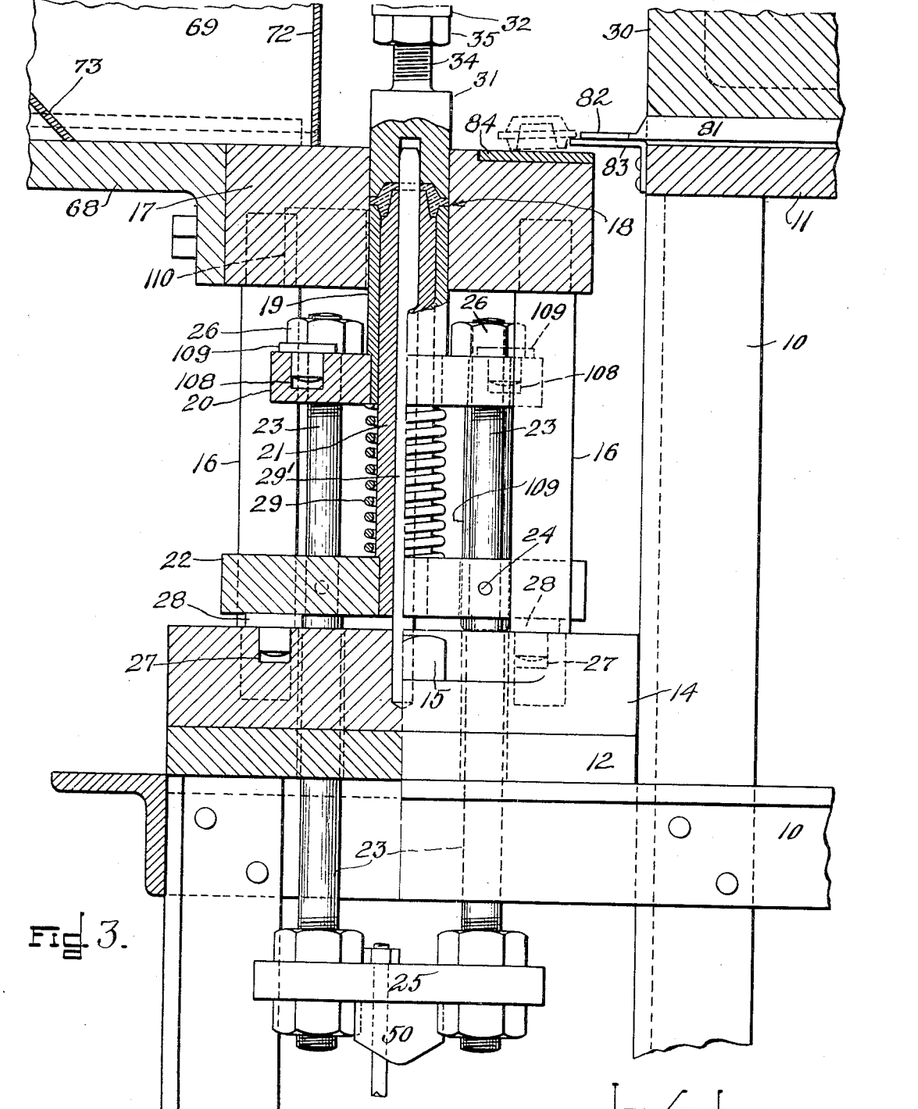
Figure 3 is an enlarged side view, partly in elevation and partly in section, of the mold mechanism of the machine shown in Figures 1 and 2.

The mold mechanism, indicated in general at 13, Figure 1, comprises a base block 14, Fig. 3, rigidly fastened to shelf 12 by means of bolts or screws 15. Fixed at their lower ends to the base block 14 are four upstanding posts 16 whose upper ends are securely connected with a fixed female mold member 17 formed near its middle with a cylindrical vertical mold chamber 18 adapted to receive within it the movable elements of the mold mechanism. The four posts 16 may be rigidly and permanently connected with the base block 14 and female mold member 17 by having their ends driven into sockets provided in said parts.

Within the mold chamber 18 is slidably fitted an outer tubular member 19 whose lower end is forcibly driven into a hole provided at the middle of an upper head 20 thereby to securely fasten the two together.

Within the tubular member 19 is slidably fitted a second inner tubular member 21 whose lower end portion is driven forcibly into a hole provided at the middle of a lower head 22 thereby to securely fasten the two together.

The lower head 22 is a metal disc formed at its middle with a hole to receive the lower end of tubular member 21 and also formed at opposite sides of said hole with two holes through which extend a pair of rods 23 which are securely fastened to lower head 22 by set screws 24.

The two rods 23 extend downwardly from head 22 and loosely through holes provided therein as well as in base block 14 and shelf 12, to a cross head 25 to which their lower ends are securely fastened.

The two rods 23 also extend upwardly from head 22 through apertures or holes provided for them in the upper head 20, said rods being slidably mounted within said apertures and each being provided above head 20 with an abutment nut 26.

The base block 14 is made at each side of its middle with sockets 27 in each of which is removably mounted an abutment plug 28. The lower head 22 is normally held seated on abutment plugs 28 by its own weight and the weight of the parts supported by it.

Surrounding the tubular member 21 is a coiled spring 29 whose lower end abuts the head 22, while its upper end abuts and supports the head 20. This spring 29 normally supports the head 20 against the abutment nuts 26 and it will be clear that normally the parts 22, 21, 29, 19, 23 and 25 are supported by the abutment plugs 28 of base block 14, while said base block 14, posts 16, and female mold member 17 are immovably mounted on the frame of the machine.

It will also be clear that the abutment plugs 28 exactly position the upper end of the inner tubular member 21 with respect to the top surface of the female mold member 17, while the stop nuts 26 accurately position the upper end of the outer tubular member 19 with respect to the upper end of the inner tubular member 21 and the top surface of member 17. Thus the volumetric capacity of the mold chamber 18 is accurately and definitely determined by adjustment of the abutment nuts 26 and by employment of abutment plugs 28 of the desired or necessary height.

The upper ends of the two telescopically associated members 19 and 21 serve as the bottom wall for the mold cavity 18, and the inner mold member 21 may, if the product requires it, be made tubular to receive within it a core member 29' whose lower end portion is driven forcibly into a socket provided for it at the middle of the stationary base block 14, thereby to securely fasten the lower end of said core member to said base block. The core 29' extends upwardly through the inner tubular member and has its upper end disposed flush with the top surface of the fixed female mold member 17.

Normally occupying a position above the mold cavity 18, and axially alined therewith, is a ram, or male mold member, that is mounted to slide vertically in a bearing 30 provided on top plate 11. This ram is herein shown as comprising a lower section 31, an intermediate section 32 and an upper section 33. The lower section 31 is made with a threaded stem 34 that is screwed into a threaded socket provided for it at the lower end of intermediate section 32 so that said lower section 31 can be adjusted vertically relatively to the female mold member 17 and the intermediate ram section 32. A check nut 35 is provided on the stem 34 by means of which section 31 is locked in its adjusted position.

At its upper end the intermediate ram section 32 is made with a spring chamber 36 within which is arranged a stiff spring 37. The lower end portion of the upper ram section 33 is telescopically and slidably fitted within the upper portion of the spring chamber 36 with its lower end in abutting engagement with spring 37. Pins 38 projecting radially from the upper ram section 33 into longitudinal slots 39 formed in the side wall of spring chamber 36 serve as stops to limit the outward movement of section 33 relatively to the spring chamber 36 and also serve to hold said parts against relative rotative movement.

Adjacent to its upper end the ram section 33 is provided with a transverse pin 40 whose opposite end portions occupy slots 41 provided at the lower ends of a pair of links 42. The upper ends of these links are pivotally connected at 43 with one arm of a lever 44 that is fulcrumed at 45 on an up-standing bracket 46 secured to the top 11 of the frame.

The other arm of lever 44 carries a cam roll 47 that is held against a cam 48 by means of a weight 49' carried by lever 44. The cam 48 is fast upon the continuously driven main shaft 49 of the machine and when rotated in the direction indicated by the arrow in Figure 1, acts through the lever 44, during each cycle of the machine, to operate and control the ram 31—32—33 in the peculiar manner hereinafter described, in timed relation with endwise movements imparted to the tubular members 19 and 21.

The cross head 25 at the bottom of mold mechanism 13 is provided near its middle with a knife-edge abutment block 50 to be engaged by one arm of a lever 51 that is fulcrumed at 52 on a bracket 53 depending from the top 11 of the frame. The other arm of lever 51 bears against the lower end of a vertically movable plunger 54 that is mounted in a bearing 55 on the frame of the machine, said plunger being provided at its upper end with a cam roll 56 that is engaged by a cam 57 fast on the main shaft 49. The periphery of the cam 57 is circular except for a relatively small rise or elevation 58, a relatively large rise or elevation 59 and a depression 60 between said two elevations.

The main shaft 49 is driven through elliptical gears 61 from a counter shaft 62 that is provided with a sprocket wheel 63, the latter being continuously driven by means of a chain that is indicated by dotted lines at 64. It will thus be clear that the speed of shaft 49 is alternately accelerated and retarded by means of the elliptical gears 61.

The cam 48 for operating the ram is made with a rise or throw 65 having two peaks 66 and 67 separated by a depression 68 and the elliptical gears 61 are timed so as to reduce the speed of shaft 49 to its lowest as the peak 66 passes the cam roll 47 so as to avoid overthrow of lever 44 and also so as to cause the roll 47 to follow the depression 68 without jumping into the same from said peak 66.

The top of the female mold member 17 is flat and horizontally flush with the top of a shelf 68 that is fastened to the outer side of member 17 so that said shelf is in fact an extension of member 17 and, together with the latter, provides a smooth, flat, horizontal surface or support on which a mold-loading mix holding receptacle 69 is slidably mounted to move back and forth in guideways 70 provided on shelf 68.

Normally the receptacle 69 occupies a retracted position at one side of mold cavity 18 and out of the path of the ram, but while the latter occupies an elevated position, and after a molded article has been removed from said cavity, the receptacle 69 is automatically moved toward the right, Fig. 1, to load the mold cavity 18 and then automatically returned to its normal retracted position illustrated in Fig. 1.

Receptacle 69 is made with oppositely disposed side walls 71, a vertical front wall 72, and an inclined back wall 73, while the shelf 68 and top of mold member 17 serve as a bottom wall for the mix holding compartment thereof.

It will therefore be clear that when the receptacle 69 is moved toward the right, Fig. 1, and its mix holding compartment is directly above the mold cavity 18, the mix will fall by gravity into cavity 18 and fill the same. Also, it will be clear that when the receptacle 69 is returned to its normal retracted position the front wall 72 of the receptacle will scrape away all of the mix that is above the level of the top surface of the mold member 17 leaving the cavity 18 brim full and containing an accurately measured quantity of mix.

The means for operating the receptacle 69 comprises two horizontally disposed bars 74 having their ends fastened to opposite sides of receptacle 69 and each slidably mounted in bearings or guideways provided upon the upper side of top 11. Each slide-bar 74 is provided with an upwardly extending arm 75 carrying a cam roll 76 that is yieldingly held against a cam 77 fast on main shaft 49 by a spring 78, one end of said spring being fastened to the rear end of its bar 74 and its opposite end being fastened to the frame of the machine.

Each of the two cams 77 is cut away as at 79, Fig. 1, and when this cut away portion passes the cam roll 76 that co-operates with said cam the receptacle 69 is reciprocated as above described. At the middle of the cut away portion 79 of each cam 77 I provide an elevation or rise 80 which operates through the means described to quickly reciprocate or jog the receptacle 69 while it is in position above cavity 18 thereby to ensure the delivery of mix into said cavity. The two slide bars 74 are of like construction as are also the two cams 77, the latter being timed to act simultaneously upon their slide bars.

The cams 48 and 57 are timed so that while the roll 47 of the ram operating lever is traversing the depression 68 of cam 48 the cam roll 56 of the plunger 54 (through which the female mold mechanism is operated) is traversing the elevation 58 of cam 57 with the result that the ram and both of the bottom members 19 and 21, Fig. 3, of the female mold mechanism are moved upwardly and then downwardly in unison wholly within cavity 18 carrying with them the partially molded body of mix that is within the mold cavity 18. This back and forth movement of the parts of the molding mechanism is effected without engagement of head 20 with the bottom of die member 17, Fig. 3, so that during said movement the relationship of the members 19 and 21 is not disturbed and they move as one.

This reciprocatory movement of the bottom members 19 and 21 in unison with the movement of the ram 31 is not sufficient to remove the molded mass from mold cavity 18 and is effected without relative movement between the parts 31, 19 and 21.

The bottom members 19 and 21 are held in fixed positions by the cam 57 while the cam roll 47 of the ram lever climbs the rise 65 to the peak 66, and the descent of ram 31 at this time lowers the latter into mold cavity 18 and forces it downwardly therein to the position illustrated in Fig. 3. Then the roll 47 traverses the depression 68 of cam 48 while the roll 56 is traversing the rise 58 of cam 57, to reciprocate the parts as just described, and the purpose of this reciprocatory movement imparted to the parts 31, 19 and 21 is to break the bond or joint between the periphery of the molded mass and the wall of the cavity 18 preparatory to the successful removal without breakage of the completely molded article from the fixed female mold member 17 and immediately precedes the application of the maximum molding pressure of ram 31 which is effected by the peak 67 of the cam 48.

That is to say, after the parts have been reciprocated up and down a short distance to free the article from the wall of cavity 18, the roll 47 traverses the peak 67 of cam 48, while the roll 56 of plunger 54 traverses the recess 60 of cam 57 with the result that a final maximum pressure is applied to the molded mass by the ram 31 for the reason that the peak 67 is somewhat higher than the peak 66.

Immediately after roll 47 traverses the peak 67 of cam 48 it descends upon the rear of the rise 65, while the cam roll 56 of plunger 54 ascends the rise 59 on cam 57. The two cams 48 and 57 are shaped and timed so that as roll 56 ascends the rise 59 and roll 47 descends, the ram 31 and bottom members 19 and 21, Fig. 3, are moved upwardly in unison without disturbing their relationship until the upward movement of the head 20 is arrested by its engagement with the bottom side of mold member 17.

Figure 6:
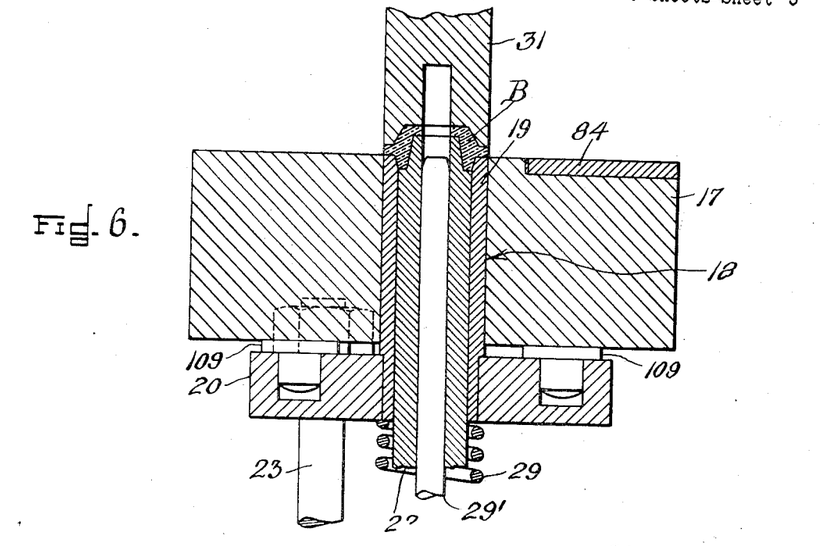
Figures 6, 7 and 8 are fragmentary views, mostly in section, illustrating the operation of the mold mechanism forming part of the machine shown in Figures 1 and 2.

This engagement occurs when the parts reach the position shown in Fig. 6 and before the roll 56 reaches the peak of the rise 59. Thereafter while roll 56 completes its ascent of rise 59 of cam 57 the head 22 and bottom member 21 continue their upward movement with the ram 31, said upward movement terminating when roll 56 reaches the crest or peak of rise 59.

Figure 7:
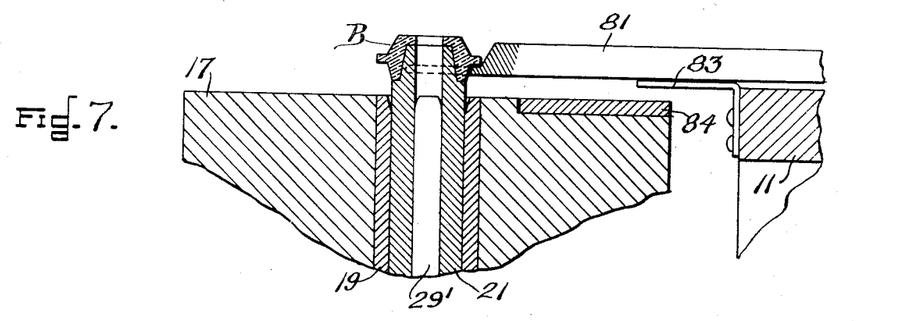

For a time thereafter the cam 48 continues to lower cam roll 47 with the result that the ram is carried upwardly away from the molded mass and the latter remains upon the upper end of the bottom member 21 as shown in Fig. 7.

While the molded mass is supported by bottom member 21 in a position above the female mold member 17 as shown in Fig. 7, a pick-off member 81 is moved forward from a retracted position into co-operative relationship with the molded mass. The forward end of pick-off member 81 is made with a fork or yoke 82 and when moved forwardly as described into the position shown in Fig. 7, this fork or yoke embraces the lower portion of the molded mass immediately below a flange that is formed upon the latter.

Figure 8:
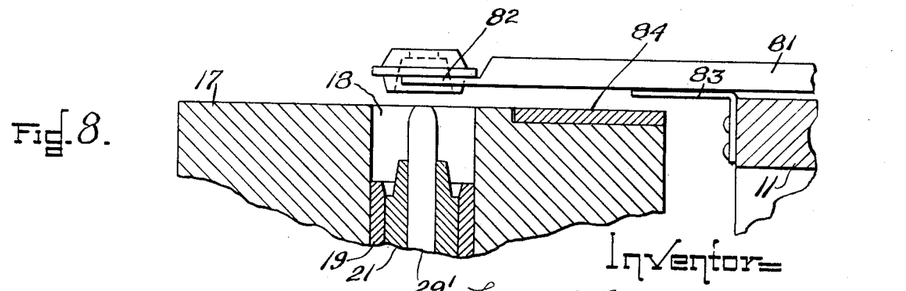

As soon as the pick-off member 81 reaches this position shown in Fig. 7, the roll 56 descends the rise 59 of cam 57 with the result that both of the bottom members 19 and 21 are restored to their lowermost positions again as shown in Fig. 8 leaving the molded mass supported by the yoke or fork 82 of pick-off member 81 whereupon the latter starts to move rearwardly toward its retracted position (toward the right in Fig. 8) and as it nears the latter the molded mass engages an abutment finger 83 projecting from the frame of the machine which slides said molded mass off from the yoke or fork 82 and on to an intermittently actuated conveyor belt 84.

The head 20 of the female mold mechanism Fig. 3, is made upon its top side with a pair of sockets 108 disposed at opposite sides of the bottom member 19 of the female mold mechanism and in each of these sockets is removably mounted an abutment plug 109.

During the upward movement of the two rods 23 the head 22, moving upwardly with said rods, acts through the spring 29 to also lift the head 20 until the abutment plugs 109 of head 20 engage the bottom side of the female mold member 17 which stops the bottom member 19 with its top flush with said female mold member 17 as shown in Fig. 6. After head 20 is thus stopped in its upward movement, spring 29 permits the head 22 and the bottom member 21 of the female mold to continue upwardly until member 21 reaches the position shown in Fig. 7. The member 21 is stopped in the position shown in Fig. 7 by the rise 59 of cam 57 while the continued descent of the cam roll 47 raises the ram well beyond that position and said ram is caused to dwell in this elevated position while the receptacle 69 is reciprocated to load the cavity 18 after the parts 19 and 21 of the female mold mechanism have been restored to their lowermost normal positions.

From the description so far given it is to be noted that a distinguishing feature in the mode of operation of this machine is that the members 31, 19 and 21, after compression of the moldable material, are reciprocated wholly within the mold cavity to break the joint between the molded mass and the wall of the cavity thus preventing breakage of the mass which would occur if force be applied to the mass while it was not completely enclosed and held against breakage.

It is also an important feature in the mode of operation of this machine that the mass is held confined between the ram 31 and the members 19 and 21 until it has been moved into a position outside of the mold cavity. When the molded mass is thus shifted out of the mold cavity while held confined between the ram and the members 19 and 21 the joints between the ram and the mass and between members 19 and 21 and the mass are opened to the atmosphere so that suction effects are prevented when the arm is lifted from the mass and when the member 21 is lowered out of engagement with the mass.

The molding mechanism herein described produces a centrally apertured and exteriorly flanged porcelain bushing B, the periphery of the flange being defined by the mold cavity 18, the entire top of the bushing being defined by the end of the ram and the entire bottom portion of the bushing being defined by the bottom members 19 and 21. The fixed core piece 29' forms the central aperture through the upper portion of the bushing as will be clear.

The pick-off member 81 is a slide bar mounted in bearings or guideways provided upon the upper side of the top 11 and to the rear end of said member is fastened one end of a spring 85, Fig. 1, whose opposite end is fastened to the frame of the machine.

The pick-off member 81 is made with an upwardly extending arm 86 carrying a cam roll 87 that is held in engagement with a cam 88 by the spring 85. This cam 88 is shaped and timed to co-operate with the spring 85 to operate the pick-off member 81 as described above.

Figures 2, 2A:
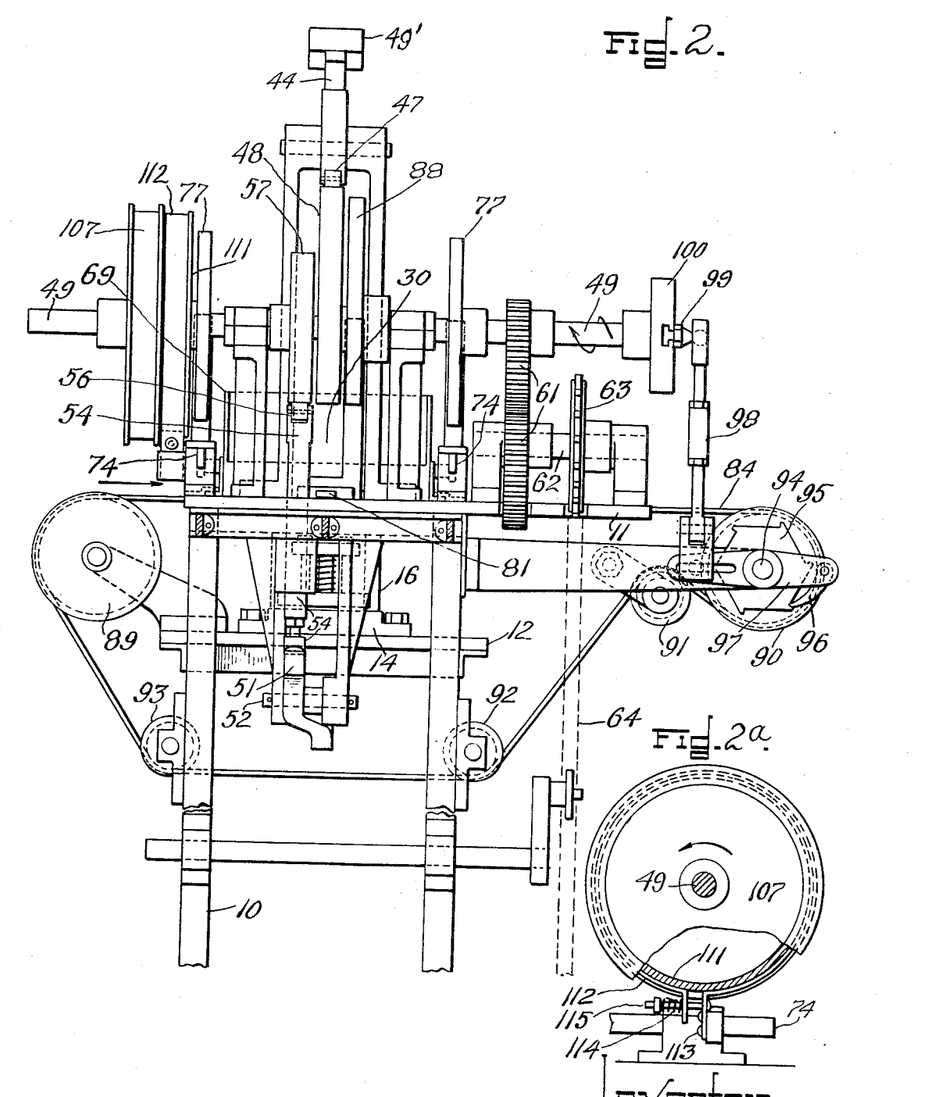
Figure 2 is a section on line 2—2 of Figure 1.
Figure 2a is a detail hereinafter described.

The conveyor belt 84 extends around, and is supported in part by, pulleys 89, 90, 91, 92 and 93, Fig. 2, so that a portion thereof extends horizontally from pulley 89 across the top of female mold member 17 to pulley 90 so as to receive upon it the molded product when the latter is disengaged from the pick-off member 81 by the abutment 83.

The pulley 90 is fast on a shaft 94 that is journaled in bearings on the frame of the machine and said shaft has fast on it a ratchet wheel 95 that is engaged by a pawl 96 carried by one arm of a lever 97. Lever 97 is pivoted loosely on the shaft 94 and has another arm to which is pivotally connected the lower end of a connecting rod 98 whose upper end is connected with a wrist pin or crank 99 adjustably mounted upon a head 100 that is fast on shaft 49.

It will thus be clear that as shaft 49 rotates it acts through wrist pin 99, connecting rod 98, lever 97, pawl 96 and ratchet wheel 95, shaft 94 and pulley 90 to move the conveyor belt 84 step by step in the direction indicated by the arrow in Fig. 2.

Thus after each article is produced by the molding mechanism it is delivered on to the traveling conveyor belt 84 by which it is transported to the pulley 90 where it may be delivered to a sagger, or otherwise disposed of.

The illustrated embodiment of my invention is particularly adapted for the production of molded articles from dry dust porcelain mix and it is a characteristic of this mix that it tends to pack and clog if the supply within the receptacle 69 is very large and of any considerable depth.

Figures 4, 5:
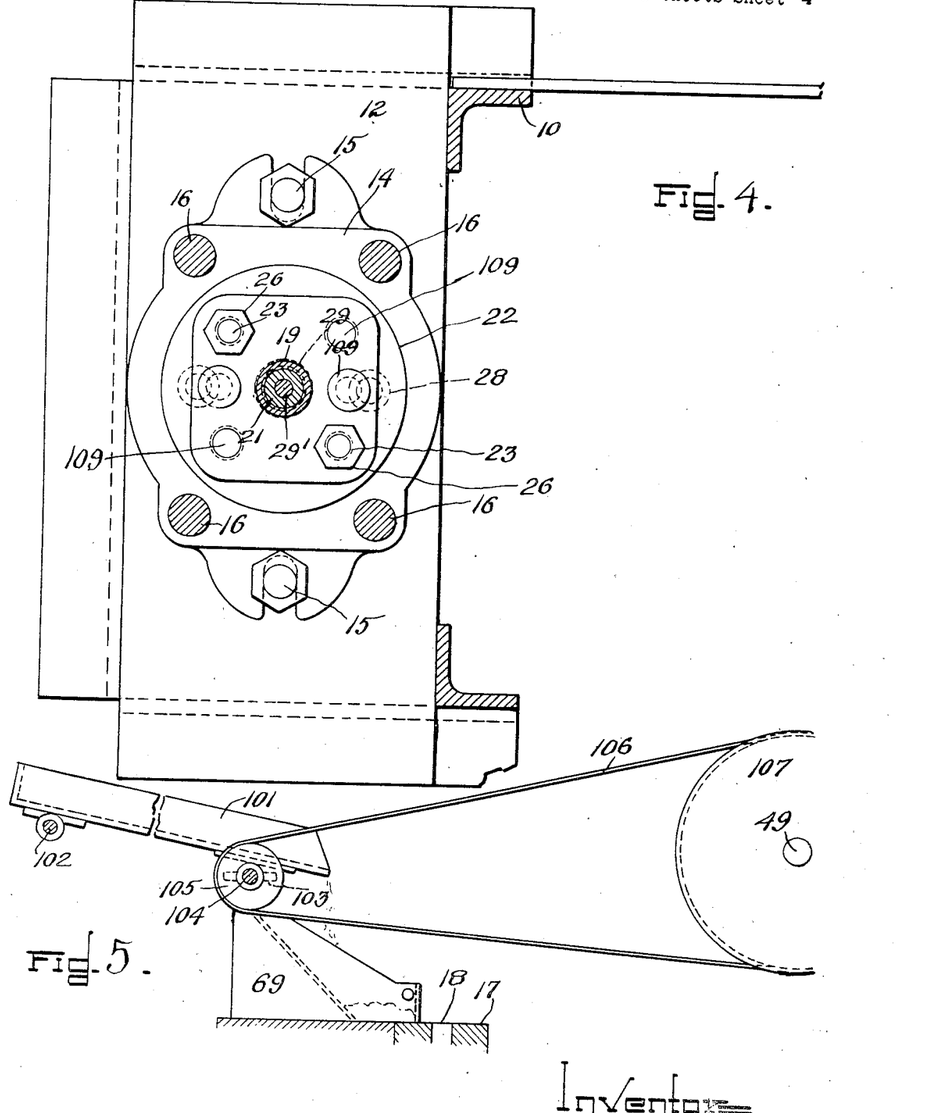
Figure 4 is a partial section on line 4—4 of Figure 1.
Figure 5 is a detail, in side elevation, of the means for feeding dry-dust mix to the mold mechanism hereinafter described.

For this reason the receptacle 69 is made of small capacity and in order to maintain only a small quantity of mix within the receptacle 69 I provide an inclined chute 101, Fig. 5, whose upper end is pivotally supported at 102 and whose lower end is disposed immediately above the mix-holding compartment of receptacle 69 and vibrated or jogged intermittently by means of a rotating cam 103.

This cam 103 is fixed on a shaft 104 carrying a pulley 105 connected by a belt 106 with a pulley 107 on continuously driven shaft 49. A supply of mix is maintained within the chute 101 and the continuously maintained vibratory motion thereof feeds the same gradually down to its lower end where it falls by gravity into the receptacle 69. The rate at which the mix is supplied to the receptacle from the chute may approximate the rate at which the mix is used by the machine and since only a comparatively small amount of mix is maintained within the receptacle it does not pack and clog.

The head 25, Figs. 1 and 3, to which the lower ends of the rods 23 are fastened, has connected with it the upper end of a spring 108 whose lower end is fastened to the frame of the machine. Thus the rods 23 and parts connected therewith are moved upwardly by lever 51 while the spring 108 moves the head 25 and rods 23 in the opposite direction when permitted to do so by lever 51.

The head 20, Figs. 3 and 4, has fastened to it the upper ends of a pair of abutment rods 109 disposed at opposite sides of the spring 29. These abutment rods 109 extend downwardly from head 20 through holes provided for them in the lower head 22 and normally the lower ends of said abutment rods 109 rest upon the top side of the base block 14. Thus the abutment rods 109 serve as stops to limit the downward movement of head 25, rods 23, and head 20 under the influence of spring 108 so that the upper end of the outer tubular member 19 is definitely positioned within the mold cavity 18 when said member occupies its normal lowermost position. The abutment rods 109 are free to move back and forth through the holes provided for them in the lower head 22. It will therefore be clear that when, during the upward movement of head 25 and rods 23, the abutments 109 seat against the under side of the mold member 17 the lower head 20, rods 23 and head 25 are free to continue their upward movement relatively to head 20. The under side of the mold member 17 is formed with recesses, one of which is indicated by dotted lines at 110 in Fig. 3, to accommodate the nuts 26 at the upper ends of the rods 23.

In order to prevent irregular motion of the shaft 49, the latter is provided with a pulley 111, Figs. 2 and 2a, around which extends a friction strap 112, one end of which is fastened at 113 to the frame of the machine. The other end of this strap is yieldingly urged toward said anchored end by means of a spring 114 and bolt 115.

What I claim is:

1. A molding machine of the character described comprising a fixed female mold member having a mold chamber extending therethrough; a tubular bottom-forming member slidably mounted within said mold chamber and projecting beyond one end of the latter; a second bottom-forming member slidably mounted within said tubular member; a top-forming ram movable into and out of said chamber at the opposite end of the latter; automatic means for forcibly moving said ram into said chamber thereby to partially mold the material that is operated upon by the machine; automatic means for moving both of said bottom-forming members and said ram in unison to a limited extent thereby to loosen said material from the surface of said chamber; automatic means for thereafter increasing the pressure applied to said material by said ram and members, and means for thereafter shifting said bottom-forming members and said ram in unison relatively to said female mold member thereby to remove the molded article from said mold chamber.

2. A molding machine of the character described comprising a fixed female mold member having a mold chamber extending therethrough, a tubular bottom-forming member slidably mounted within said mold chamber and projecting beyond one end of the latter, and a second bottom-forming member slidably mounted within said tubular member; a top-forming ram movable into and out of said chamber at the opposite end of the latter, and mechanism operating automatically to forcibly move said ram into said chamber thereby to partially mold the material that is operated upon by the machine, then to reciprocate both of said bottom-forming members and said ram in unison to a limited extent without removing the molded material from said chamber thereby to loosen said material from the surface of said chamber; then to increase the pressure applied to said material by said ram and bottom-forming members, then to shift said bottom-forming members and said ram in unison relatively to said female mold member thereby to remove the molded article from said mold chamber while it is held between said bottom-forming members and ram, and then to move said ram out of engagement with the molded material and into a retracted position.

3. A molding machine of the character described constructed in accordance with claim 2, and also including a traveling conveyor having a portion thereof supported adjacent to said fixed female mold member, and automatic means for transfering the molded product to said conveyor after its removal from said mold chamber.

4. A molding machine of the character described constructed in accordance with claim 2 wherein said female mold member is made with a flat approximately horizontal top surface from which said mold chamber extends downwardly; wherein a mix-holding receptacle having an outlet at its bottom is slidably mounted upon said surface, and wherein means is provided for automatically reciprocating said receptacle while said ram occupies its retracted position thereby to move said outlet back and forth across the upper end of said mold chamber to load the latter with mix.

5. A molding machine of the character described constructed in accordance with claim 2 wherein said female mold member is made with a flat approximately horizontal top surface from which said mold chamber extends downwardly; wherein a mix-holding receptacle having an outlet at its bottom is slidably mounted upon said top surface; wherein means is provided for automatically reciprocating said receptacle while said ram occupies its retracted position thereby to move said outlet back and forth across the upper end of said mold chamber to load the latter with mix, and wherein means is provided for automatically evening off the top of the body of mix deposited within said chamber so that it is flush with said top surface.

6. A molding machine of the character described constructed in accordance with claim 2, wherein said female mold member is made with a flat approximately horizontal top surface from which said mold chamber extends downwardly; wherein a mix-holding receptacle having an outlet at its bottom is slidably mounted upon said top surface; wherein means is provided for automatically reciprocating said receptacle while said ram occupies its retracted position thereby to move said outlet back and forth across the upper end of said mold chamber to load the latter with mix, and wherein said receptacle is made with a wall which scrapes back and forth on said flat top surface thereby to even off the top of the body of mix deposited within said chamber so that it is flush with said top surface.

7. A molding machine of the character described, comprising a fixed female mold member having a mold chamber extending therethrough; an outer tubular bottom-forming member having one end thereof slidably mounted within said mold chamber and its opposite end projecting beyond one end of said chamber; an inner tubular bottom-forming member having one end thereof slidably mounted within said outer tubular member and its opposite end projecting beyond the outer end of said outer tubular member; a stationarily supported core on which said inner tubular member is slidably mounted; a top-forming ram movable into and out of said chamber at the opposite end of the latter, and power driven mechanism operating automatically to first load said chamber with mix then to forcibly move said ram into said chamber thereby to partially mold the contents thereof, then to reciprocate said bottom-forming members and ram in unison to a limited extent without removing the molded mix from said chamber thereby to loosen said mix from the surfaces of said chamber and core, then to increase to the maximum the pressure applied to said mix by said ram and bottom-forming members, then to move said bottom-forming members and said ram in unison relatively to said female mold member thereby to remove the molded article from said chamber while it is held between said bottom-forming members and said ram, and thereafter to move said ram out of engagement with said molded article to permit of removal of the latter.

8. In a machine of the character described, in combination, a fixed female mold member having a mold chamber extending therethrough; a top-forming ram movable into and out of the upper end of said chamber; power driven mechanism operating automatically to reciprocate said ram; an outer tubular bottom-forming member having its upper end portion slidably mounted within said chamber and its lower end portion extending below said female mold member and provided with an abutment to engage the bottom of the latter when said tubular member is raised a predetermined distance; an inner bottom-forming member having its upper end portion slidably mounted within said outer tubular member and its lower end portion extending below the latter; a spring through which upward movement of said inner member acts to raise said outer member until the latter is stopped by engagement with said female mold member and which permits said inner member to continue its upward movement after said outer member is stopped; means for limiting relative movement of said inner and outer members in the opposite direction so that downward movement of the former acts at times to move the latter downwardly also, and power driven mechanism operating automatically to impart reciprocatory motion to said inner member in timed relation with the movements of said ram and so as to cause it to reciprocate said outer member in timed relation with the movement of said ram also.

9. A machine of the character described constructed in accordance with claim 8 and also including means operated automatically in timed relation with the movements of said ram and said bottom-forming members for loading said chamber with a measured amount of mix during each cycle of the machine.

10. A machine of the character described, constructed in accordance with claim 8 wherein said inner bottom-forming member is also tubular and wherein a stationarily supported core is provided within said inner member.

11. A machine of the character described constructed in accordance with claim 8, wherein said power driven mechanisms are operable during each cycle of the machine to forcibly move said ram into said chamber thereby to partially mold the material that is being operated upon, then to reciprocate both of said bottom-forming members and said ram in unison to a limited extent without removing the molded material from said chamber thereby to loosen said material from the surface of said chamber, then to increase the pressure applied to said material by said ram and bottom-forming members, then to shift said bottom-forming members and said ram in unison relatively to said female mold member thereby to remove the molded article from the upper end of said mold chamber while it is held between said bottom-forming members and ram, then to move said ram and inner member upwardly a predetermined distance while said outer member is held at rest, and then to move said ram out of engagement with the molded material and into a retracted position.

12. A machine of the character described constructed in accordance with claim 1 and also including a movably supported pick-off member on to which the molded article is delivered by downward movement of said inner bottom-forming member, and power driven means operating automatically to shift said pick-off member into and out of receiving position in timed relation with the movements of said inner member thereby to transport the molded article away from the latter.

13. A machine of the character described constructed in accordance with claim 1 and also including a movably supported pick-off member on to which the molded article is delivered by downward movement of said inner bottom-forming member; power driven means operating automatically to shift said pick-off member into and out of receiving position in timed relation with the movements of said inner member thereby to transport the molded article away from the latter; a traveling conveyor in proximity to the path of said pick-off member; means for transferring the molded article from said pick-off member to said traveling conveyor when said pick-off member is moved away from said inner member.

14. A machine of the character described constructed in accordance with claim 1 and also including a mix-holding receptacle of relatively small capacity slidable back and forth upon the top of said female mold member and having an outlet at its bottom that is shifted into and out of register with the upper end of said chamber when said receptacle is operated; means for automatically reciprocating said receptacle in timed relation with the movements of said ram and bottom-forming members; an inclined movably supported chute for delivering mix into said receptacle, and power driven means operating automatically to continuously move said chute back and forth thereby to effect the discharge of mix from the lower end thereof into said receptacle.

15. In a machine for molding porcelain articles from a dry dust mix, the combination with a female mold member having a vertical mold chamber extending therethrough, of a receptacle supported for movement back and forth on top of said female mold member and having an outlet at its bottom that is carried into and out of register with the upper end of said mold chamber when said receptacle is reciprocated, said receptacle being of relatively small capacity so as to avoid packing and clogging of the mix held therein; means operable to move said receptacle back and forth on said female mold member thereby to load the mold chamber of the latter; an inclined chute of relatively large mix-holding capacity having its lower end disposed above said receptacle and pivotally supported adjacent to its upper end, and means engaging the lower end portion of said chute for vibrating the latter continuously thereby to effect delivery of mix from said chute into said receptacle.

LEONARD N. BAENZIGER.